(12) United States Patent
Neubecker et al.

(10) Patent No.: US 12,352,590 B2
(45) Date of Patent: Jul. 8, 2025

(54) STRANDED MOTORIST ASSISTANCE SYSTEM

(71) Applicant: FORD GLOBAL TECHNOLOGIES, LLC, Dearborn, MI (US)

(72) Inventors: Cynthia M. Neubecker, Westland, MI (US); Adil Nizam Siddiqui, Farmington Hills, MI (US); Robert Parenti, Dearborn, MI (US); Andrea Bowes Chowanic, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 655 days.

(21) Appl. No.: 17/386,830

(22) Filed: Jul. 28, 2021

(65) Prior Publication Data

US 2023/0029497 A1 Feb. 2, 2023

(51) Int. Cl.
*G01C 21/36* (2006.01)
*G01C 21/16* (2006.01)
*G01C 21/34* (2006.01)
*H04W 52/02* (2009.01)

(52) U.S. Cl.
CPC ..... *G01C 21/3602* (2013.01); *G01C 21/1656* (2020.08); *G01C 21/3423* (2013.01); *G01C 21/3469* (2013.01); *H04W 52/028* (2013.01)

(58) Field of Classification Search
CPC ............ G01C 21/3602; G01C 21/1656; G01C 21/3423; G01C 21/3469; H04W 52/028
See application file for complete search history.

(56) References Cited

U.S. PATENT DOCUMENTS

| | | | |
|---|---|---|---|
| 6,973,298 B2 * | 12/2005 | Chang | G01S 19/17 455/456.1 |
| 8,401,565 B2 | 3/2013 | Sandberg et al. | |
| 9,121,421 B2 | 9/2015 | Van Wiemeersch et al. | |
| 9,644,969 B2 | 5/2017 | Koenig et al. | |
| 2008/0034008 A1 * | 2/2008 | Burke | G06F 16/9574 |
| 2010/0332116 A1 * | 12/2010 | Sakashita | G01C 21/20 701/533 |
| 2013/0261879 A1 * | 10/2013 | Chen | G01M 17/025 701/31.8 |

(Continued)

*Primary Examiner* — Abdalla A Khaled
(74) *Attorney, Agent, or Firm* — Frank L. Lollo; MacMillan, Sobanski & Todd, LLC

(57) ABSTRACT

A help system is provided for a vehicle occupant who carries a mobile communication device. The vehicle has a transceiver providing two-way wireless telecommunication and which detects a loss-of-signal condition. A powertrain system provides vehicle movement and is configured for reckoning a path traversed by the vehicle. The help system includes a guidance controller and an interface adapted to connect to the mobile communication device. The guidance controller is configured to A) identify a crossing point when the transceiver detects an initiation of the loss-of-signal condition, B) store a breadcrumb route for returning to the crossing point based on the reckoned path, C) detect a stranded condition of the vehicle during the loss-of-signal condition, D) generate guidance instructions including the breadcrumb route from the vehicle back to the crossing point when the stranded condition is detected, and E) transfer the guidance instructions to the mobile communication device.

20 Claims, 5 Drawing Sheets

(56) References Cited

U.S. PATENT DOCUMENTS

| | | | | |
|---|---|---|---|---|
| 2015/0039224 | A1* | 2/2015 | Tuukkanen | H04W 4/021 |
| | | | | 701/500 |
| 2016/0285294 | A1* | 9/2016 | Watanabe | H02J 7/0048 |
| 2017/0086022 | A1* | 3/2017 | Beattie, Jr. | H04W 8/08 |
| 2017/0311367 | A1* | 10/2017 | Ursitti | H04W 48/04 |
| 2017/0325056 | A1* | 11/2017 | Mehta | H04W 4/90 |
| 2018/0209808 | A1* | 7/2018 | Wang | G06F 18/214 |
| 2019/0056735 | A1* | 2/2019 | Koopman | B60W 50/023 |
| 2019/0265064 | A1* | 8/2019 | Koenig | G06F 3/04842 |
| 2019/0289125 | A1* | 9/2019 | Mosenia | H04M 1/72454 |
| 2020/0389053 | A1* | 12/2020 | Lee | H04B 5/26 |
| 2021/0229552 | A1* | 7/2021 | Nagata | B60K 35/00 |

* cited by examiner

STRANDED MOTORIST ASSISTANCE SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to a vehicle system for monitoring a driving route and for providing personal navigation assistance in the event of a stranding of the vehicle in an area without wireless telecommunication service, and, more specifically, to support for a personal mobile device (e.g., smartphone) to help a user evacuate from a stranded vehicle to a location where telecommunication service is available.

Wireless telecommunications systems such as cellular telephone networks are relied on heavily by users for requesting emergency assistance while traveling. Although cellular networks provide large coverage areas, there remains to be remote and/or topographically difficult areas where cellular service is absent or unreliable. Recreational usage of certain motor vehicles (e.g., off-road driving) may often involve traveling to areas without cellular connectivity (i.e., non-connected zones) such as mountains, deserts, or wilderness.

If a vehicle becomes stranded (i.e., unable to move) while in a non-connected zone because of a vehicle breakdown or getting stuck, the vehicle occupant(s) may be unable to send for help using their mobile telecommunication devices (e.g., cellular smartphone) without first returning to an area where cellular service is available. Particularly when driving off-road, the path back to the location that last had available cellular service may be difficult to identify and/or remember for a user who attempts to retreat to the location on foot or by bicycle (if available). Thus, the stranding of a vehicle may pose a big challenge for the driver and passengers. Navigating by foot or bicycle in non-connected zones may be particularly challenging when illumination is limited (during the night or evening) and when trails are obscured after a snowfall, for example. While many smartphones may be equipped with radionavigation (e.g., a global positioning system (GPS) receiver), the corresponding satellite signals may also become unavailable such that the smartphone is unable to determine the user's location or provide guidance to any particular destination.

Even if radionavigation is available, it may be possible that a battery-powered smartphone or other handheld mobile device may have a charge state of the battery that is insufficient to keep the device operating long enough to reach a connected zone and complete the calls necessary to seek emergency services.

SUMMARY OF THE INVENTION

The invention may utilize vehicle sensing technology and vehicle computing and data storage in order to deliver support to users via the smartphones, including instructions for following a proposed exit route and for performing recommend actions to help ensure sufficient battery charge in the smartphone for traversing back to a connected zone and contacting emergency service providers.

In one aspect of the invention, a vehicle comprises a transceiver providing two-way wireless telecommunication, wherein the transceiver is configured to detect a loss-of-signal condition. The vehicle also comprises a powertrain system providing vehicle movement and configured for reckoning a path traversed by the vehicle. The vehicle comprises a guidance controller coupled to the transceiver and the powertrain system which has an interface adapted to connect to a battery-powered mobile communication device of an occupant of the vehicle. The guidance controller is configured to A) identify a crossing point between a connected zone and a non-connected zone when the transceiver detects an initiation of the loss-of-signal condition, B) store a breadcrumb route for returning to the crossing point based on the reckoned path during the loss-of-signal condition, C) detect a stranded condition of the vehicle during the loss-of-signal condition, D) generate guidance instructions including the breadcrumb route from a location of the vehicle back to the crossing point when the stranded condition is detected, and E) transfer the guidance instructions to the mobile communication device.

DETAILED DESCRIPTION OF PREFERRED EMBODIMENTS

Figure 1:
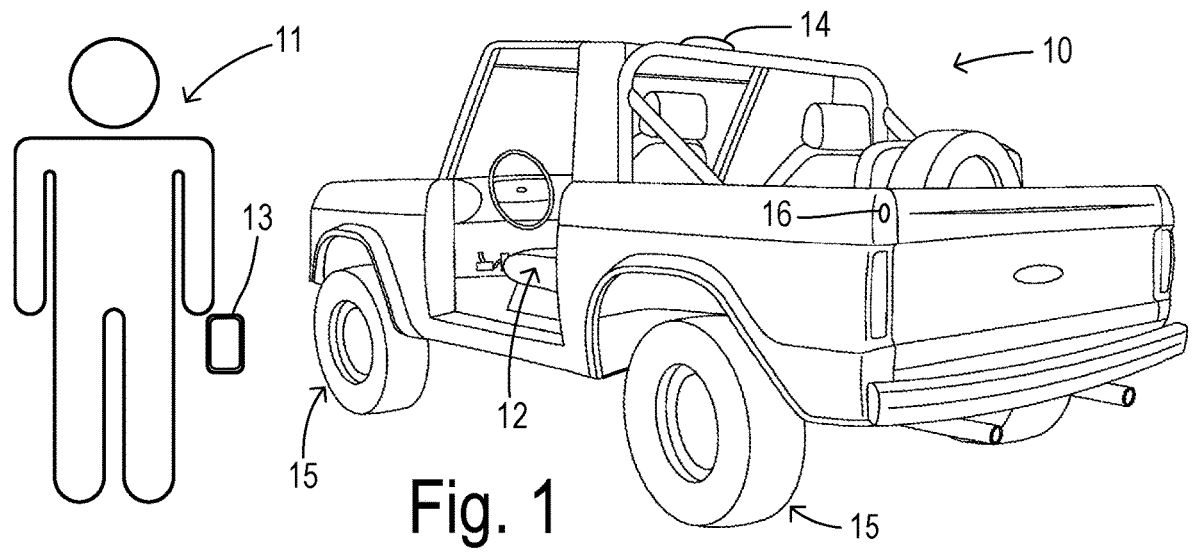
FIG. 1 is a perspective view of a vehicle adapted for off-road usage and a vehicle occupant with a mobile telecommunication device.

Referring to FIG. 1, a vehicle 10 of a type adapted for off-road usage has a passenger compartment 12 for accommodating an occupant 11 (e.g., a driver). Occupant 11 has a mobile wireless telecommunications device 13 such as a smartphone which can be used inside or outside of vehicle 10. Vehicle 10 preferably also includes a wireless telecommunications transceiver (not shown) connected to an antenna module 14 which may include antennas for a cellular telephone service and a radionavigation system (such as GPS or any other global navigation satellite system, or GNSS) as commonly deployed in motor vehicles. Vehicle 10 may include any type of electrified or gasoline-powered powertrain for driving wheels 15. Vehicle 10 includes a plurality of data collectors (e.g., sensors) such as an exterior-looking camera 16 and a suite of sensors associated with the powertrain system.

Figure 2:
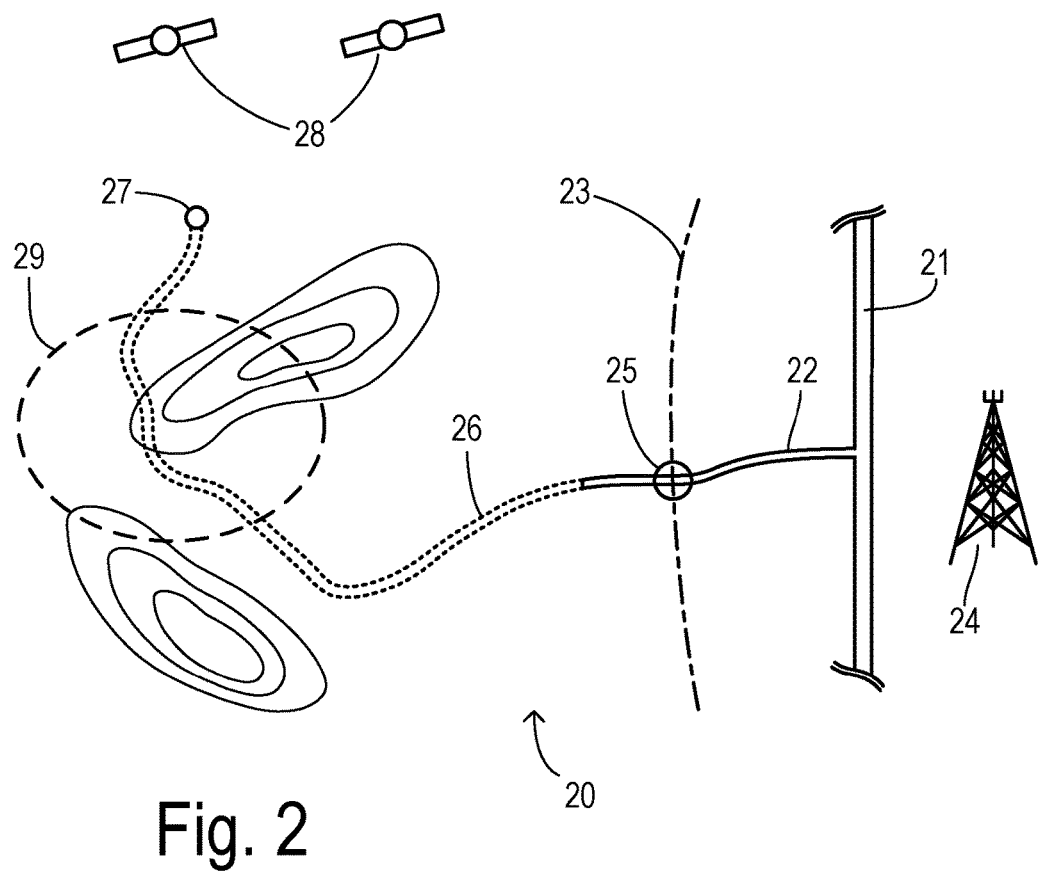
FIG. 2 depicts an aerial mapping view of a vehicle path which crosses into a non-connected zone, transitions to off-road driving, and ends at a stranded location.

FIG. 2 represents a region which is traversed by a vehicle following a path selected by a driver. A main road 21 leads to a local road 22 which is followed until the vehicle goes off-road along an off-road path 26. Cellular transceivers (e.g., permanently installed in the vehicle and contained in the occupant's smartphone) may be connected with a cellular base station 24 until passing into a non-connected zone at crossing point 25 (e.g., where the transceivers detect a loss-of-signal condition). Once the cellular signal is lost, the invention monitors and stores the path traversed by the vehicle in order to later provide guidance instructions to navigate back to crossing point 25. Eventually, the vehicle may become stranded at a stranded location 27. During at least a portion of the overall path, the vehicle may pass through a region 29 having terrain (e.g., mountainous areas) or obstacles (e.g., tunnels) where GNSS signals from GNSS satellites 28 are not receivable. Where GNSS signals are not receivable, the recording of the original route and/or guidance along an exit route may utilize other location-reckoning technology such as dead reckoning (using accelerometers, compass, axle sensors, etc.).

The invention may be comprised of interactions between the electronic systems of the vehicle and a user's handheld mobile device as directed by programming (e.g., apps executing on a smartphone and on a vehicle controller module) to coordinate the procedures described herein. From the moment the vehicle enters a non-connected zone, vehicle systems record as initial location of a crossing point (e.g., a geographic coordinate obtained by GNSS or other tracking system) and the following turn-by-turn maneuvers based on GNSS updates, steering wheel angle sensor signals, drive axle sensor signals, and other data to create a breadcrumb map which is stored by the vehicle. In addition, the invention may monitor the vehicle systems to detect a stranded condition. Alternatively, the existence of a stranded condition may be manually indicated by the driver. The stranded condition can be automatically detected based on images and/or vehicle data. For example, a "stranded-state detector" could be based on a function of wheel slippage, vehicle movement (e.g., from the integral of accelerometers x,y,z measurements), change of GNSS coordinates, and/or vehicle speed from an axle sensor signals, wherein the function detects a stationary vehicle during a time that the driver intent is to move (e.g., the engine is on, transmission status is non-park, and the throttle, steering, and brake inputs are active/changing).

When a stranded condition is detected while in a non-connected zone, a guidance controller in the vehicle may initiate a help mode. A human-machine interface (HMI) in the vehicle may push an offer of help to the user, or the user may request the help mode via the HMI. The vehicle HMI may display a help icon which results in an interactive Q&A which provides assistive information to the vehicle occupant (e.g., Do you need help to download to your phone a smart help guide?) and may provide a walkthrough for preparing their mobile device for non-vehicular travel from the location of the vehicle back to the crossing point.

The guidance controller may monitor the charge state of the smartphone(s) at the time the vehicle becomes stranded in order to recommend any needed recharging prior to leaving the vehicle in seeking assistance. Vehicle interior sensing technologies (such as WiFi or a phone-as-a-key (PAAK) application) may identify available smartphones or other mobile devices in the vehicle along with their state(s) of charge which can be compared with estimated times to return to the connected zone or a desired cross road (e.g., by foot or bicycle, if available). The HMI (which may be part of an in vehicle infotainment system, or IVI) may recommend a time of charge to achieve sufficient battery life, and may also recommend battery saving strategies or limitation on smartphone use, such as time limits for flashlight On-Time or brightness when used at night, music playback limitations, and other non-connected device app usage reductions.

The guidance controller may initiate pairing with identified smartphones or other mobile devices to download a breadcrumb exit route (i.e., telemetry) back to the crossing point. The exit route may also include a destination such as a main road when assistance may be encountered. The guidance controller (vehicle computer) or the in-phone app may utilize the route data to calculate non-vehicular travel times by foot or bicycle needed to return to the desired location. Based on the times, a needed state of charge can be determined, and a recommend recharge is provided if below the needed level (e.g., to last for the travel time plus a threshold to allow continued use once the connected zone is reached). Once the driver/passengers exit the vehicle, as a result of downloading to their mobile device(s), they will have a map showing the vehicle location and a breadcrumb map back to the connected zone and/or main road. The vehicle can also upload a diagnostic status or diagnostic code to the mobile device so that when the driver reaches help, it is easy to describe the problem (e.g., a flat tire, or an engine diagnostic code).

Figure 3:
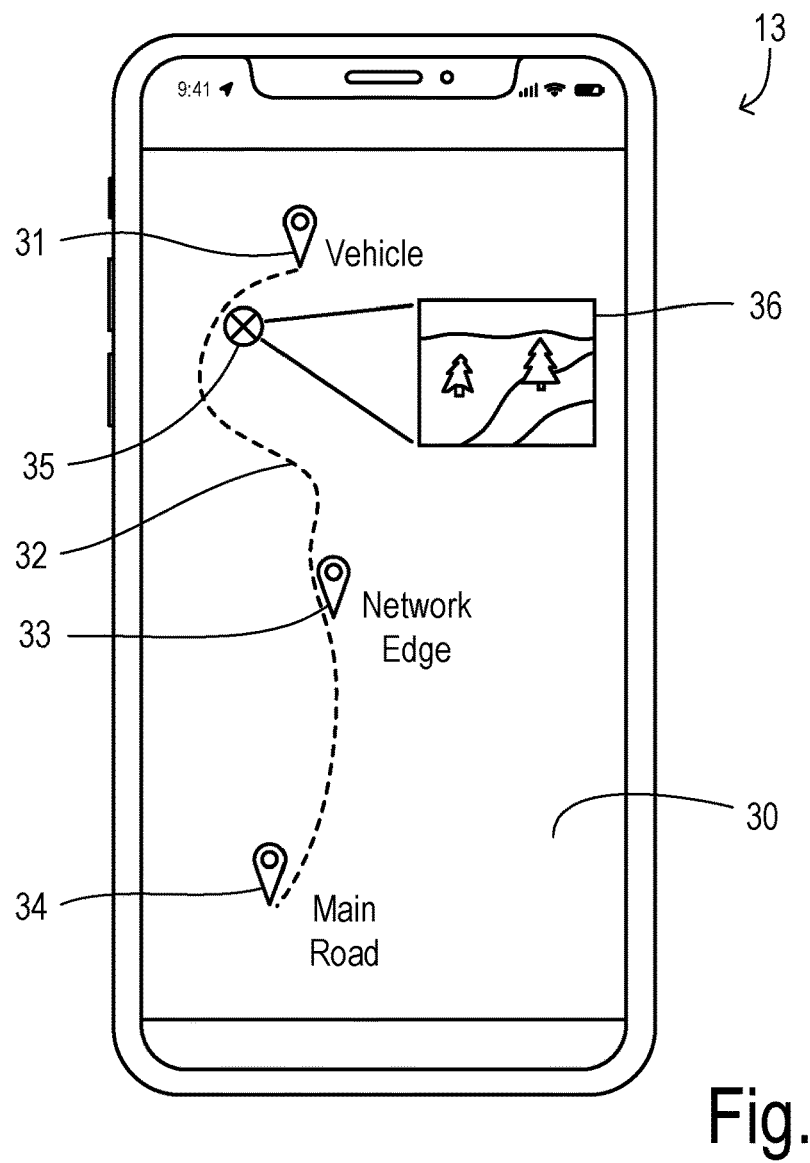
FIG. 3 is a screenshot of a smartphone display which presents a user with an exit route as a breadcrumb trail for returning from a stranded vehicle to a connected zone.

FIG. 3 shows an example of a map display on a display screen 30 of smartphone 13. A breadcrumb route shows a current vehicle location 31 and a breadcrumb path 32 corresponding to the original vehicle path which provides a return route to a crossing point 33 (i.e., a network edge where cellular service should be available) and a main road destination 34. Although crossing point 33 is shown in the example as being closer to vehicle location 31, it could be farther away from vehicle location 31 than main road destination 34.

A monitored user location 35 of the mobile device may be displayed. An automatically determined user location may be used if available, of the user may select a location manually. In some embodiments, specific route guidance corresponding to user location 35 can be displayed. For example, a previously captured camera image 36 may be displayed which allows a user to verify their progress along path 32. Such camera images may be collected by the vehicle as part of the monitoring of vehicle movement prior to stranding.

Figure 4:
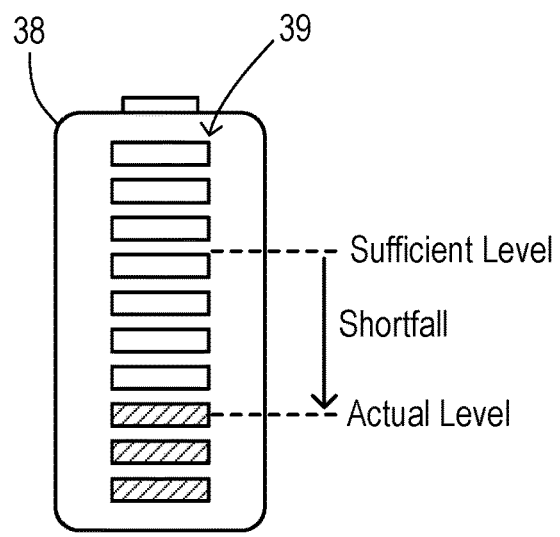
FIG. 4 is a graphic display showing a state of charge of a battery which powers a mobile telecommunications device of a user.

Smartphone 13 preferably includes a battery management circuit and function which can determine a state of charge of an internal battery. As shown in FIG. 4, the state of charge of a battery 38 may be determined according to fractional steps or bars 39. In the example shown, there is an actual charge level of three bars. Based on an expected battery depletion rate and an estimated travel time as determined by a guidance controller and/or a smartphone app, a sufficient level of battery charge is determined to be 7 bars. Thus, a battery charge shortfall which is comprised of the difference between sufficient and actual battery state of charge is determined to be 4 bars. Using an expected charging rate, the user can be provided with a recommended charging time before leaving the vehicle to ensure that a connected zone is reached while enough battery capacity remains to complete a cellular phone call.

Figure 5:
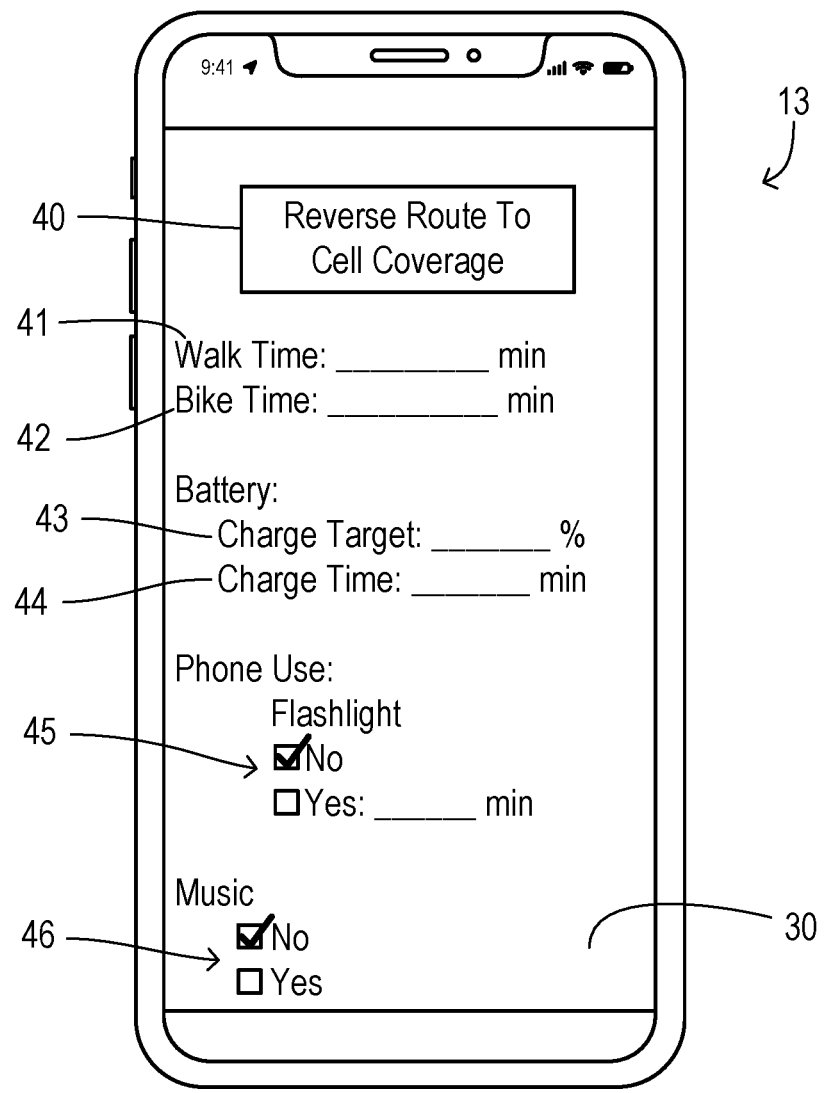
FIG. 5 is a screenshot of a smartphone display which presents a user with supplemental information and instructions for successfully following a breadcrumb trail.

FIG. 5 shows an example of a display of a portion of the guidance instructions relating to travel time and battery details. Display screen 30 shows a header 40 to identify that the help system app is active. A data field 41 displays an estimated walking travel time to return to the connected zone (e.g., in minutes). A data field 42 displays an estimated biking travel time (e.g., if the user has indicated that a bicycle is available). A data field 43 indicates a target charge level which is estimated to be sufficient for the purposes of navigating to the connected zone and then making telecommunication calls. A data field 44 displays a needed charging time, if any, that would be projected to obtain the target charge level. Check boxes 45 and 46 are displayed for showing recommended usage limitations such as time limits for using a flashlight function and any prohibitions against using battery power to play music or other audio or video entertainment.

Figure 6:
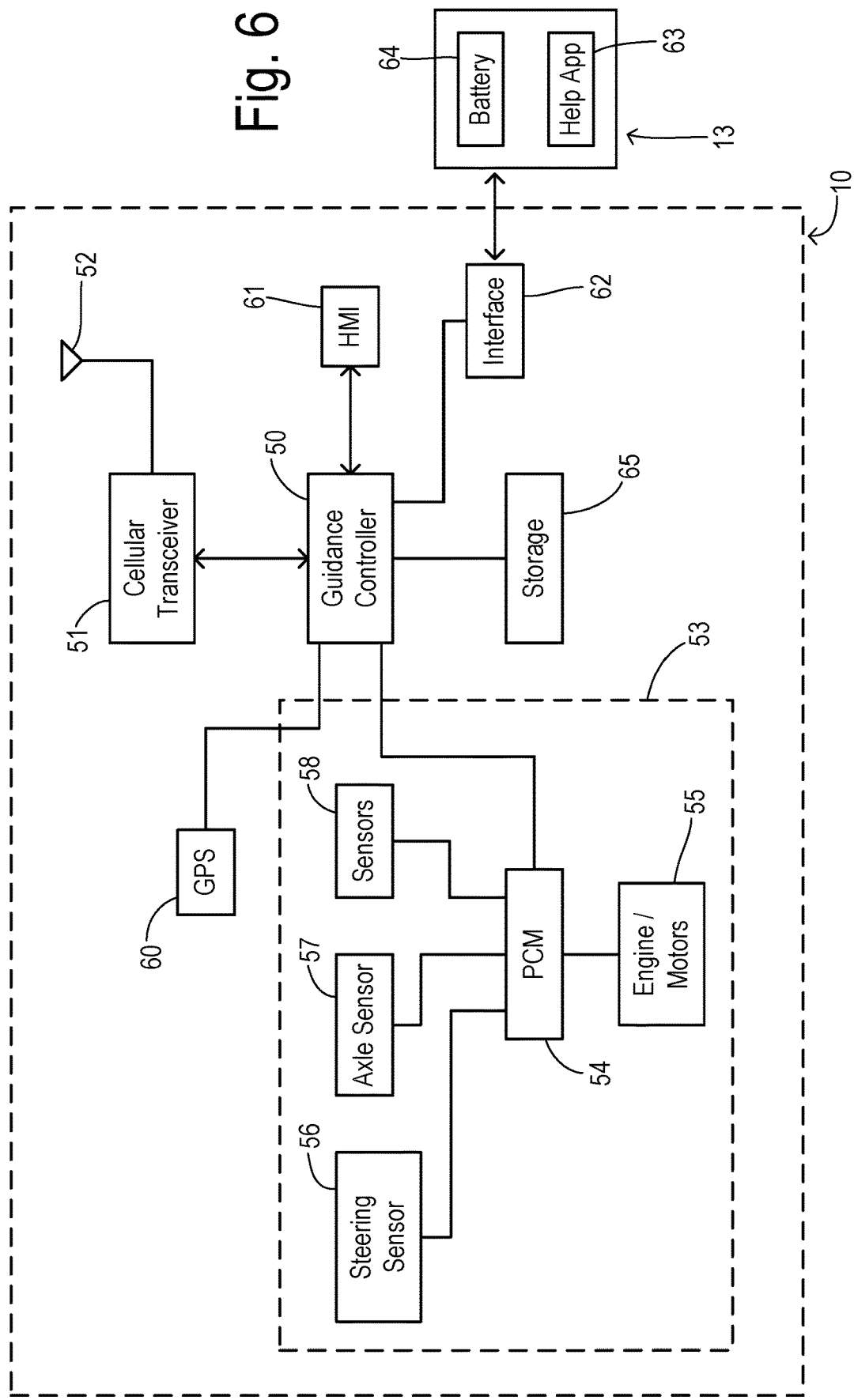
FIG. 6 is a block diagram showing a vehicle with a help system according to one preferred embodiment.

FIG. 6 shows relevant portions of vehicle 10 in greater detail. A guidance controller 50 is coupled to a cellular transceiver 51 which conducts wireless telecommunications with a remote network via an antenna 52. Vehicle 10 includes a powertrain system 53 which is controlled as least in part by a powertrain control module (PCM) 54 to provide vehicle movement and configured for reckoning (i.e., representing in a geographic space) a path that is traversed by the vehicle. PCM 54 is coupled to many sensors and actuators as known in the art. An internal combustion engine and/or electric traction motors 55 are controlled by PCM 54. Data collection normally conducted by PCM 54 which may also be used by guidance controller 50 to perform its help functions may be provided by sensors including a steering angle sensor 56, an axle rotation sensor 57, and a plurality of other sensors which preferably includes an external camera for capturing images of a surrounding terrain during travel in a non-connected zone. A GPS receiver 60 is coupled to guidance controller 50 and/or powertrain system 53.

An HMI 61 is coupled to guidance controller 50 for exchanging information and/or commands with a user. A mobile interface 62 couples guidance controller 50 with a smartphone 13 of a vehicle occupant in order to provide interaction according to a help app 63 executing on smartphone 13 and to exchange charge information relating to a battery 64 in smartphone 13. Interface 62 may be comprised of a short-range wireless data networking connection (such as a Bluetooth® link) or a wired interface (such as a USB connection).

Guidance controller 50 may be a standalone control unit, or may be integrated with one or more other vehicle control modules such as a body control module or an in vehicle infotainment module, for example.

Figure 7:
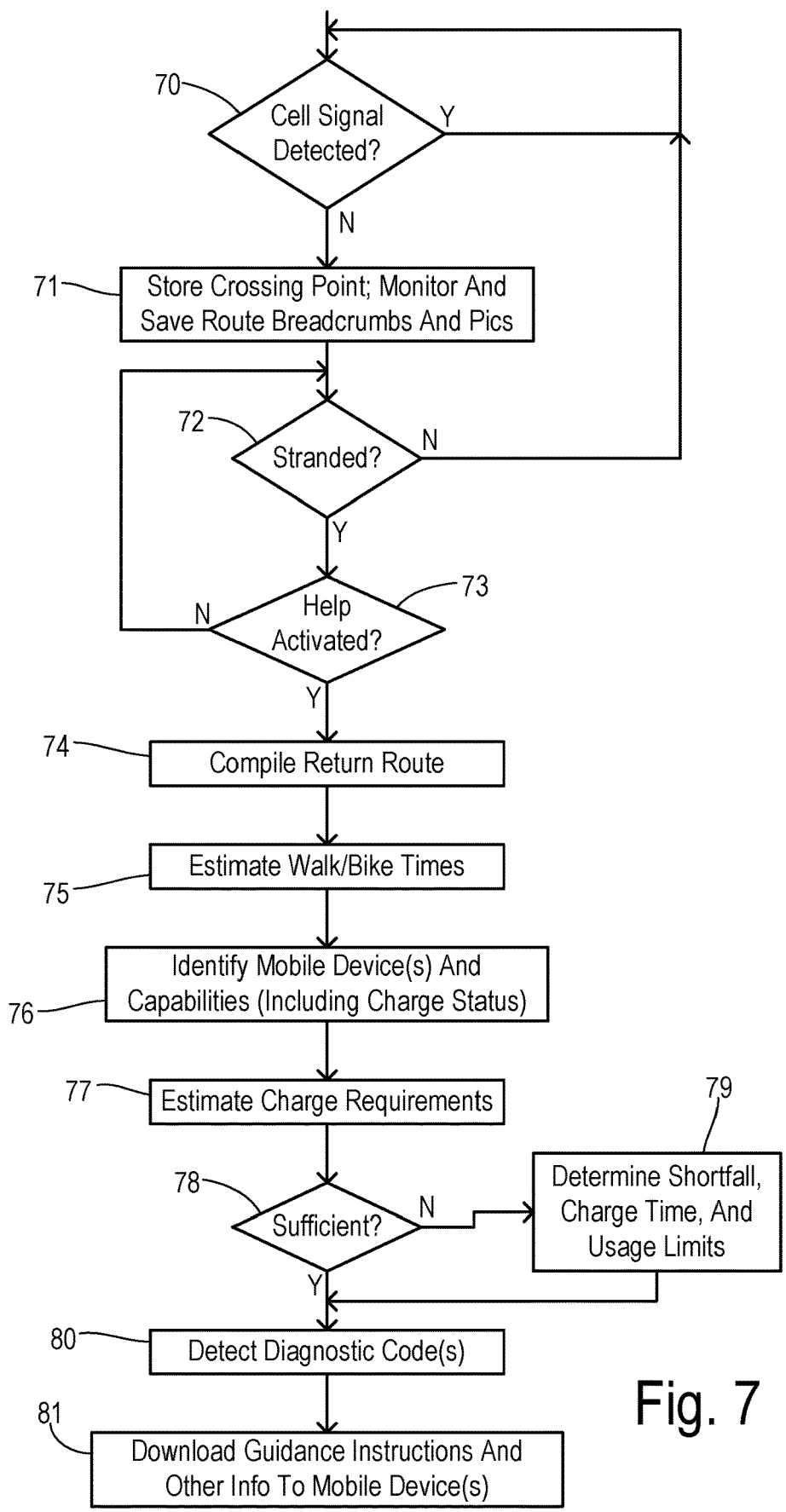
FIG. 7 is a flowchart showing one preferred method of the invention.

An example method of the invention is shown in FIG. 7. As a vehicle is operated in a driving mode, a check is periodically performed in step 70 to determine whether an active connection with a wireless cellular service is detected. If so, then the periodic checks continue. If a cell signal is not detected, then the crossing point (e.g., geographic coordinates) at the edge of the cellular network availability is stored in step 71 and the vehicle electronics systems (e.g., guidance controller) henceforth monitors and saves the route being traversed. The saved data preferably includes a breadcrumb representation (e.g., turn-by-turn and/or segment-by-segment) of a reckoned path along with captured images of an area through which the path passes. Reckoning of the path may include tracking the vehicle location using a GNSS receiver, dead-reckoning using vehicle motion sensors, or a combination of the two. The saved data may also include periodically captured images of the vehicle surroundings wherein each image is indexed to a corresponding location along the breadcrumb representation so that a user can access the images while walking or biking the exit route to verify the proper path.

In step 72, a check is performed to determine whether the vehicle has become stranded. Stranding may be detected when 1) onboard vehicle sensors fail to detect vehicle movement when actions are being taken which should cause movement, or 2) a powertrain controlled detects a failure state such as loss of engine output. Stranding may also be detected in response to a manual signal from a user. If not stranded then a return may be made to step 70 to continue monitoring for cellular service and to monitor the vehicle path while cellular service is absent. When stranded, an optional check may be performed in step 73 to determine whether the help functions are activated by a user. If the user does not desire to utilize the help functions, then a return is made to step 72 in order to continue to monitor for a stranded condition.

When the help functions are activated, then a breadcrumb exit route is compiled by the guidance controller in step 74 as a reversal of the vehicle path traversed since cellular service was lost. In step 75, walking and/or biking travel times to complete the exit route is estimated (as calculated by the guidance controller and/or the user's mobile device). The estimated travel times may take into account the route distance and expected speeds for each particular type of conveyance along respective portions of the exit route. The expected speeds may be determined using various factors such as terrain type, elevation change, time of day, weather, and user age and health. Supporting data may be collected by the vehicle during the original vehicle travel along the route, such as ground surface slip index or a route roughness index for the traversed terrain In step 76, the mobile devices available for interaction with the vehicle and the capabilities of the mobile devices (including battery status and size) are identified. Based on the travel time(s) and expected charge consumption(s), the required level of battery charging to successfully complete an exit route and make a call for help is estimated in step 77. In step 78, the existing charge level is compared to the required level to determine whether the existing charge level is sufficient. If not sufficient, then the shortfall and a charging time are determined in step 79. If any nonessential uses of the mobile device (e.g., playing music or excessive use of a flashlight function) would result in the maximum battery capacity being insufficient to successfully complete an exit route and make a call for help, then step 79 may also specify usage limits for recommendation to the user.

If the vehicle is able to determine a cause for the stranding of the vehicle, then it detects an associated diagnostic code in step 80. An help app executed on the mobile device may be configured to enable the user to retrieve the diagnostic code(s) after completing the exit route so that the nature of any vehicle malfunctions can be communicated to an emergency responder, for example.

In step 81, guidance instructions (including the breadcrumb exit route, travel times, smartphone recharge time, smartphone usage limitations, diagnostic codes, and other information) are downloaded to the mobile device(s) of the user(s). Thus, even in remote areas where cellular service and GNSS service are unavailable or intermittent, the invention provides assistance to improve a stranded user's ability to confidently undertake a non-vehicular trek back to a location where assistance can be obtained.

What is claimed is:
1. A vehicle comprising:
a transceiver providing two-way wireless telecommunication, wherein the transceiver is configured to detect a loss-of-signal condition;

a powertrain system providing vehicle movement and configured for reckoning a path traversed by the vehicle;

a guidance controller coupled to the transceiver and the powertrain system and having an interface adapted to connect to a battery-powered mobile communication device of an occupant of the vehicle, wherein the guidance controller is configured to A) identify a crossing point between a connected zone and a non-connected zone when the transceiver detects an initiation of the loss-of-signal condition, B) store a breadcrumb route for returning to the crossing point based on the reckoned path during the loss-of-signal condition, C) detect a stranded condition of the vehicle during the loss-of-signal condition, D) generate guidance instructions including the breadcrumb route from a location of the vehicle back to the crossing point when the stranded condition is detected, and E) transfer the guidance instructions to the mobile communication device.

2. The vehicle of claim 1, wherein the vehicle includes at least one exterior-looking camera capturing images at respective locations on the breadcrumb route, and wherein the guidance instructions include the images.

3. The vehicle of claim 1, wherein the guidance controller is further configured to estimate a non-vehicular travel time to the crossing point, and wherein the travel time is included in the guidance instructions.

4. The vehicle of claim 3, wherein the non-vehicular travel time is a walking time.

5. The vehicle of claim 3, wherein the non-vehicular travel time is a biking time.

6. The vehicle of claim 1, wherein the guidance controller is further configured to F) estimate a non-vehicular travel time to the crossing point, G) estimate a sufficient charge level of a battery of the mobile communication device which is sufficient to provide two-way wireless telecommunication in the connected zone after expiration of the estimated travel time, H) identify an actual charge level of the battery, and I) notify the occupant of a charge shortfall when the actual charge level is less than the sufficient charge level.

7. The vehicle of claim 6, wherein the guidance instructions further include a recommended charge time according to the charge shortfall.

8. The vehicle of claim 6, wherein the guidance instructions further include recommended limitations of usage for nonessential functions of the mobile communication device.

9. The vehicle of claim 1, wherein the guidance controller is further configured to identify a diagnostic code corresponding to a cause of the stranded condition, and wherein the diagnostic code is included in the guidance instructions for dissemination by the occupant after reaching the crossing point.

10. The vehicle of claim 1, wherein the powertrain system is comprised of a plurality of data collectors including a steering sensor and an axle sensor adapted for monitoring the path by dead reckoning.

11. The vehicle of claim 1, further comprising a global navigation satellite system (GNSS) receiver configured to monitor the path.

12. The vehicle of claim 1, wherein the interface is comprised of a short-range wireless data networking connection.

13. The vehicle of claim 1, wherein the stranded condition is detected according to a failure state within the powertrain system.

14. The vehicle of claim 1, wherein the stranded condition is detected according to a manual signal generated by the occupant and transmitted to the guidance controller.

15. The vehicle of claim 1, wherein the wireless telecommunication is comprised of cellular telephone communication.

16. A help system for an occupant of a transportation vehicle, wherein the occupant utilizes a battery-powered mobile communication device, wherein the vehicle includes a transceiver providing two-way wireless telecommunication, wherein the transceiver is configured to detect a loss-of-signal condition, and wherein the vehicle includes a powertrain system providing vehicle movement and configured for reckoning a path traversed by the vehicle, the help system comprising:

a guidance controller adapted to couple to the transceiver and the powertrain system; and an interface adapted to connect to the battery-powered mobile communication device;

wherein the guidance controller is configured to A) identify a crossing point between a connected zone and a non-connected zone when the transceiver detects an initiation of the loss-of-signal condition, B) store a breadcrumb route for returning to the crossing point based on the reckoned path during the loss-of-signal condition, C) detect a stranded condition of the vehicle during the loss-of-signal condition, D) generate guidance instructions including the breadcrumb route from a location of the vehicle back to the crossing point when the stranded condition is detected, and E) transfer the guidance instructions to the mobile communication device.

17. The help system of claim 16, wherein the vehicle includes at least one exterior-looking camera capturing images at respective locations on the breadcrumb route, and wherein the guidance instructions include the images.

18. The help system of claim 16, wherein the guidance controller is further configured to estimate a non-vehicular travel time to the crossing point, and wherein the travel time is included in the guidance instructions.

19. The help system of claim 16, wherein the guidance controller is further configured to F) estimate a non-vehicular travel time to the crossing point, G) estimate a sufficient charge level of a battery of the mobile communication device which is sufficient to provide two-way wireless telecommunication in the connected zone after expiration of the estimated travel time, H) identify an actual charge level of the battery, and I) notify the occupant of a charge shortfall when the actual charge level is less than the sufficient charge level including a recommended charge time according to the charge shortfall and a recommended limitations of usage for nonessential functions of the mobile communication device.

20. The help system of claim 16, wherein the guidance controller is further configured to identify a diagnostic code corresponding to a cause of the stranded condition, and wherein the diagnostic code is included in the guidance instructions for dissemination by the occupant after reaching the crossing point.

* * * * *